United States Patent [19]

Giltzow

[11] Patent Number: 4,591,013
[45] Date of Patent: May 27, 1986

[54] MULTI-RANGE WEIGHT SCALE

[75] Inventor: J. Hunter Giltzow, Roseland, N.J.

[73] Assignee: Ketcham & McDougall, Inc., Roseland, N.J.

[21] Appl. No.: 678,746

[22] Filed: Dec. 6, 1984

[51] Int. Cl.⁴ .................. G01G 23/14; G01G 23/26
[52] U.S. Cl. .................................. 177/230; 177/169
[58] Field of Search ............... 177/164, 168, 169, 170, 177/230

[56] References Cited

U.S. PATENT DOCUMENTS

| 1,408,264 | 2/1922 | Burkhard | 177/168 X |
| 1,946,775 | 2/1934 | Zwickl | 177/230 |
| 3,168,154 | 2/1965 | Chappell et al. | 177/168 X |
| 3,358,784 | 12/1967 | Weickhardt | 177/169 |

Primary Examiner—E. A. Goldberg
Assistant Examiner—Patrick W. Foster
Attorney, Agent, or Firm—Edwin E. Greigg

[57] ABSTRACT

A multi-range weight scale which includes an adjustable cam that changes the weight arms-mechanism so that the scales will weigh a normal weight load or twice the normal weight load.

4 Claims, 4 Drawing Figures

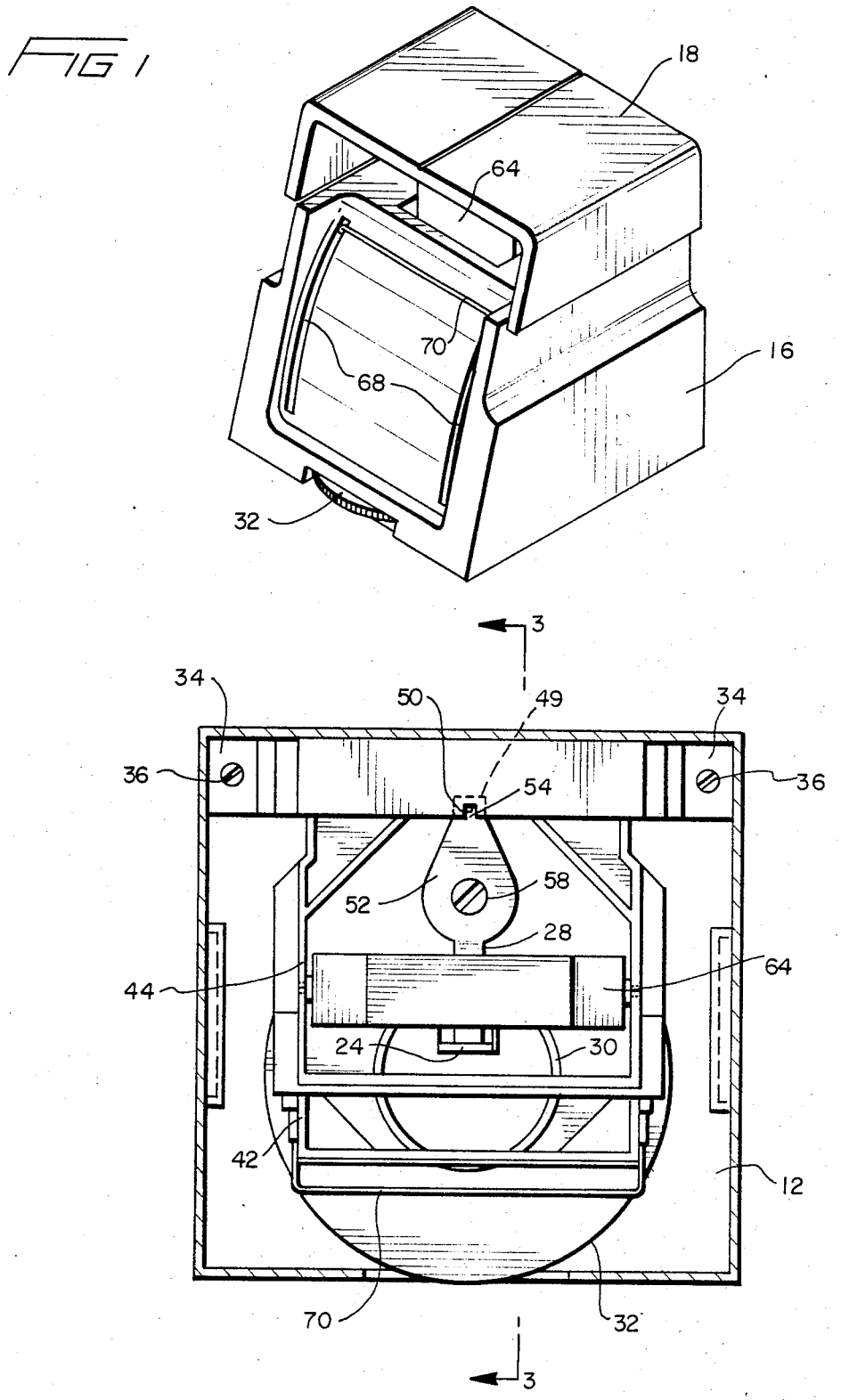

MULTI-RANGE WEIGHT SCALE

This invention is directed to a small weighing scale and more particularly to a multi-weight scale which can be adjusted for weighing more than one weight range.

Heretofore small sized self-contained scales have been used for weighing small amounts in which the maximum weight was one complete continuous movement of the scale mechanism for the products weighing from the least amount to the maximum amount. Such scales usually weigh from 0 to 16 ounces or are calibrated to weigh from 0 up to 10 lbs. However, such scales weigh from 0 to the maximum during one continuous movement and are usually equipped for an adjustment for the zero weight setting only.

The scales of this invention have a weight range which has the same resolution and is provided with an adjusting cam that doubles the weight range with the same resolution. For instance, one continuous movement over one range may be from 0 to 16 ounces then by adjusting the cam to its maximum adjustment, the weight can be exactly doubled by starting with 1 ounces and weighing up to 32 ounces over one other continuous movement of the product platform. Thus, before adjustment, the scales will weigh from 0-16 ounces, then by adjusting the cam, the scale will weigh from 16 ounces to 32 ounces. It would be obvious that by changing the size of the parts, the invention could cover other ranges of weights.

It is therefore an object of the invention to provide a multi-range scale which can be adjusted for the same resolution over two different ranges of weights for one continuous movement of the scale platform.

Another object is to provide a dual weight scale that can be adjusted for a "tare weight" of up to one range of the scale movement and still weigh an amount of one range of movement with the same resolution.

Still another object is to provide a dual weight scale that can double the weight measuring load by a simple adjustment means and with the same resolution.

BRIEF DESCRIPTION OF THE DRAWINGS

FIG. 1 illustrates a front side view in perspective of the scales.

FIG. 2 is a top inside view with the cover removed to show the inside elements.

DESCRIPTION OF THE DRAWINGS

Figure 3:
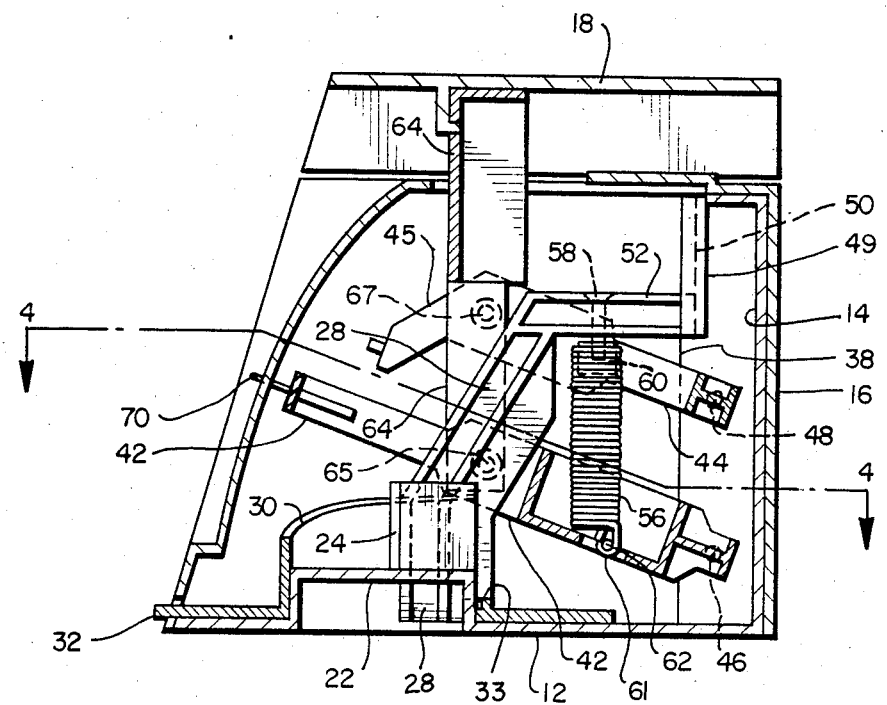
FIG. 3 is a cross-sectional view from front to back taken along the lines 3—3 as shown in FIG. 2.
Figure 4:
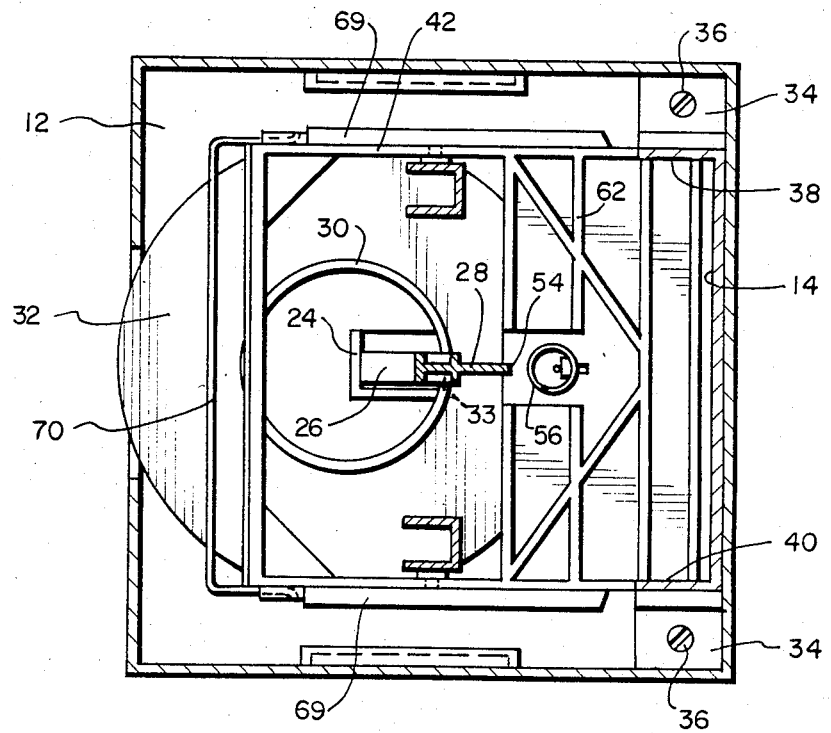
FIG. 4 is a sectional view taken along lines 4—4 of FIG. 3.

Now referring to the drawings wherein like reference characters refer to like parts there is shown the relative parts of the multi-range scales. As shown, the device includes a bottom 12, a back support plate 14, which may be integrally molded with or secured at the back end of said bottom, the weight determining element vertically movable relative to the back support plate, a cover 16 and a product support platform 18.

The bottom plate 12 is provided with an upstanding closed end cylinder 22, on a central plane, nearer the front of the base. The closed end cylinder has a rectangular upright extension 24 which provides a rectangular passage 26 through which one end of a spring support 28 passes. The closed end cylinder supports and is surrounded by an adjusting helical cam 30 which is integral with a rotating calibrating knob 32 that has a portion that extends beyond the front of the base through a slot in the cover. The rotating calibrating knob 32 rotates on the base around the cylinder 22. The spring support has a cut out shoulder 33 on its backside which rides on the cam. The upright extension 24 provides a guide for the lower end of the spring support 28.

The upright back support plate is provided with outwardly extending feet which are secured to the base by use of any suitable means such as screws 36 or integrally molded thereto. The back support plate has forwardly extending sides 38 and 40 to which lower and upper arms 42 and 44 are connected at one end by pivots 46 and 48. The upper arm has a portion that is parallel with the lower arm and a front portion 45 that bends downwardly toward the bottom arm. The front, bent portion prevents the front end of the upper arm 45 from striking the housing during the adjustment of the spring support by the cam.

The back support has a centrally located forward extending rib 49 which is provided with a slot 50. The upper end of the spring support is provided with an oval-shaped parallel extension 52 that is provided with a central rib 54 on the back side that rides within the slot 50 in the back support. The upper end of the constant tension weight spring 56 is secured below the oval-shaped extension 52 by use of a screw 58 or any other suitable means and a spring securing means 60. The bottom end 61 of the constant tension weight spring is secured to a cross bar 62 near the back end of the lower arm. Each of the upper and lower arms are formed by parallel spaced arm elements that form the side of the arms.

Near the central portion of the arms, an upright bar 64 that is pivotably secured along its sides at 65 and 67 to each of the side arms of the lower and upper arms. The upright bar extends through the upper surface of the housing and a product support platform 18 is secured to the upright bar 64. The front portion of the housing is provided with spaced parallel vertical slots 68 which have the same spacing as the side elements of the lower arm. The side elements of the lower arm are provided with slots 69 into which fit the ends of a weight indicator. The weight indicator extends from the outside through the vertical slots 68 into the slots 69 in the side elements of the lower arm and move with the lower arm. The front face of the housing is provided with a weight indicia. The left side may be graduated as a measure of ounces from 0-16 and the right side may be a measure of 16-32ounces. In between the weight indicia, corresponding cost per weight may be added to the front. The indicia could be formed on a separate sheet which is properly secured to the front face of the cover between the slots in the cover.

In assembly, the shoulder 33 on the back surface of the weight spring support rides on the cam 30. The weight spring 56 has a downward tension on the spring support so that the rib 54 remains in the back slot 50 and the shoulder 33 remains on the cam. When the cam is rotated so that the spring support shoulder is at its lowest point, the cam can be rotated a little to set the weight indicator at zero setting. The scales with the cam in this position will indicate the weight on the left side, such as from 0-16 ounces. If the weight is greater than 16 ounces, the cam is rotated to lift the weight spring support, which also raises the arm such that a one-pound preload is placed on the weight spring. Thus, the weight spring can move twice the distance of the first setting.

In this manner, the scale will indicate the weight according to the right hand side of the indicia. Thus, the scales will weigh from 16–32 ounces. Obviously, different sized and tensioned springs may be used for indicating lbs., etc. With the cam rotated to place a preload on the weight spring, the scales will weigh twice the weight of that without the preload.

Rotation of the cam enables one to zero the scale in order to account for the weight of a container which is to hold a product. Therefore, a one-pound "tare weight" capability is built into the scales.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A multi-range weight scale which comprises:
a bottom base plate,
a cam supported by said bottom plate, and
weight determining means secured relative to said cam, said cam adjusting said weight determining means to zero scale in an initial weight capacity, for tare weight application permitting a preload up to an initial weight capacity and rezero scale to weigh articles up to twice the initial capacity including preload weight, to preload the scale with an initial weight capacity to weigh articles having weight up to double the initial weight capacity and from a first weight range having the same resolution to a second weight range which is exactly double that of said first weight range with the same resolution.

2. A multi-range weight scale as set forth in claim 1 which comprises:
upper and lower arms,
a product platform supported by said upper and lower arms,
a weight spring separated by said lower arm and one end of a spring holder,
means for rotating said cam, and
said spring holder is supported by said cam and adjustable thereby for adjusting said weight spring and a weight range setting of said scales.

3. A multi-range weight scale as set forth in claim 2 which comprises:
a back support for pivotably supporting said upper and lower arms, and for slidably supporting said spring holder relative to said back support.

4. A multi-range weight scale as set forth in claim 3, which comprises:
a cover which is secured to said base plate.

* * * * *